Patented May 27, 1947

2,421,361

UNITED STATES PATENT OFFICE 2,421,361

PROCESS FOR MAKING DIOLEFINS

Walter J. Toussaint, South Charleston, and Jesse T. Dunn, Charleston, W. Va., assignors to Carbide and Carbon Chemicals Corporation, a corporation of New York No Drawing. Application September 29, 1942, Serial No. 460,120

20 Claims. (Cl. 260—681)

The subject of this invention is a process for making olefines, and it more particularly relates to a process for making dienes, such as 1,3-butadiene.

Processes for making 1,3-butadiene wherein ethanol and acetaldehyde are passed over certain dehydration catalysts are known. Modifications of these processes wherein ethanol alone is passed over combined dehydrogenation and dehydration catalysts are also reported in the literature. These known processes have been investigated and found unsatisfactory because of the low efficiencies obtained.

In the copending application of W. M. Quattlebaum, Jr., and W. J. Toussaint, Serial No. 458,736, a process is disclosed for making 1,3-butadiene or its homologs by passing crotonaldehyde or its homologs with an alcohol, such as ethanol, in the vapor state over heated silica gel. The over-all reaction which occurs may be represented as follows:

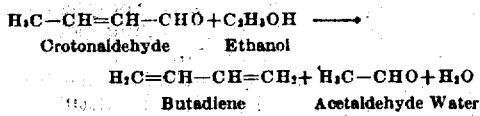
Crotonaldehyde   Ethanol $H_2C=CH-CH=CH_2 + H_3C-CHO + H_2O$
Butadiene   Acetaldehyde  Water According to the present invention, certain other catalysts are used for the same or similar reactions and they are found to be sufficiently active to operate satisfactorily at low concentrations of crotonaldehyde, as well as at higher concentrations of crotonaldehyde. Probably because of their greater activity, the catalysts of this invention are also effective when the crotonaldehyde itself is not fed to the reaction zone, but in its place an aldehyde capable of condensing to crotonaldehyde is used. For example, silica gel is capable of converting crotonaldehyde and ethanol to butadiene, acetaldehyde and water. It is also capable of forming crotonaldehyde from acetaldehyde. In the reaction involving the formation of butadiene from crotonaldehyde and ethanol in the presence of silica gel, it is usually found that the concentrations of crotonaldehyde, acetaldehyde and water vapor are such that the acetaldehyde formed from the ethanol is not converted to crotonaldehyde, but instead crotonaldehyde is converted to some extent to acetaldehyde. Also, if acetaldehyde, rather than crotonaldehyde, is fed along with ethanol over heated silica gel some crotonaldehyde is formed, but its concentration is so low that a very small amount of butadiene is formed from it. However, if crotonaldehyde and ethanol are passed over the catalysts of the present invention, the concentration of the crotonaldehyde is readily reduced by the catalytic formation of butadiene, acetaldehyde and water to a point low enough so that acetaldehyde, which is a product of the butadiene forming reaction, is converted to crotonaldehyde. These conclusions are based on the observed results that less acetaldehyde is found in the effluent reaction products than would be accounted for by the ethanol consumed; and that more butadiene is formed than would be expected from the original crotonaldehyde introduced. Also, if acetaldehyde instead of crotonaldehyde is passed with ethanol over the catalysts of the present invention, a good yield of butadiene is obtained, in contrast to the results observed with silica gel, or with the catalysts of the prior art.

This over-all reaction may be represented as follows:

$H_3C-CH_2OH + H_3C-CHO \longrightarrow$
Ethanol   Acetaldehyde

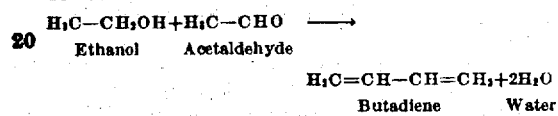
Butadiene   Water

The catalysts of this invention consist of the group of zirconium oxide, tantalum oxide, columbium oxide and combinations of these oxides with silica. These combinations may be in the form of the silicates of zirconium, tantalum or columbium, or they may consist of silica gel promoted by admixture with one or more of the oxides of these metals. This latter embodiment is the preferred form of the catalyst.

In the presence of these catalysts, crotonaldehyde and ethanol react at a suitable temperature to form butadiene, acetaldehyde and water. It is believed that this is the essential reaction occurring even when acetaldehyde, rather than crotonaldehyde, is fed with the ethanol, although only small amounts of crotonaldehyde are found to be present in the reaction products, and it may exist as a transitory intermediate largely in the adsorbed form on the catalyst. The reasons for concluding that crotonaldehyde is an important intermediate are that the catalysts are found to be capable of forming crotonaldehyde from acetaldehyde rapidly at the temperature of the reaction in the absence of ethanol, and that they are also found capable of rapid conversion of crotonaldehyde and ethanol into butadiene, acetaldehyde and water.

In general, substituted crotonaldehydes, including ketones, formed by substituting the aldehydic hydrogen atom, may be expected to react similarly to crotonaldehyde, provided that they are capable of rearranging to an enol form. In general, compounds which are capable of keto-enol tautomerism contain a labile hydrogen atom attached to a carbon atom which is attached to a carbonyl group. Also, in place of acetaldehyde, other carbonyl compounds capable of condensation to homologs of crotonaldehyde may be employed.

Thus, the formation of 1,1-dimethyl butadiene from acetone and isopropanol has been indicated, presumably through the intermediate formation of mesityl oxide. To the extent that they condense with each other, mixtures of carbonyl compounds may be employed to yield dienes containing the same number of carbon atoms as the sum of the carbon atoms of the carbonyl compounds. Thus, isoprene in association with other dienes may be formed when mixtures of acetaldehyde and propionaldehyde are reacted with ethanol in the presence of the catalysts of this invention.

On the other hand, when the carbonyl compounds contain at least four carbon atoms and an olefinic bond conjugated with the carbonyl group, they react with primary and secondary alcohols in the presence of the catalysts of this invention to yield conjugated dienes of the same number of carbon atoms as the carbonyl compounds introduced, and only small amounts of higher hydrocarbons are formed.

The distinctive characteristic of the catalysts of this invention, as compared with silica gel, is that they tend to a much greater degree to give dienes when saturated aldehydes which are condensable to higher aldehydes together with an alcohol are passed over them. In those instances where the simple, direct reaction of the saturated aldehyde with the alcohol is relatively slow, a diene, rather than a mono-olefine, is obtained in excellent yield. This is what occurs with acetaldehyde.

Therefore, it is to be presumed that, if the aldehyde reacts readily with the alcohol on the catalyst surface, a hydrocarbon of the same number of carbon atoms as the aldehyde will be obtained. However, if the rate of this reaction is exceeded by the rate of condensation of the aldehyde to a higher unsaturated aldehyde and by the rate of reaction of the latter with the alcohol, then a conjugated diene will be obtained, having twice as many carbon atoms as the original aldehyde. The yields of the various possible products will be determined by the pertinent reaction velocities.

The alcohol employed in any of these reactions may be any alcohol capable of dehydrogenation to a carbonyl compound, and this comprises the class of primary and secondary alcohols. Despite the fact that secondary alcohols show as much or even greater reactivity than primary alcohols, it is usually more desirable to employ an alcohol which is capable of being converted to a carbonyl compound identical to that introduced.

In the practice of this reaction, it is found that some unavoidable side-reactions occur, particularly the formation of high-boiling condensation products from the aldehydes and of low-boiling olefines by dehydration of the alcohols. The proportion of aldehyde to alcohol is adjusted to minimize these reactions as is shown by the examples.

One of the more important industrial applications of the invention is the conversion of ethanol and acetaldehyde to butadiene, which is a valuable intermediate in the production of synthetic rubber. In practice, ethanol is the ultimate raw material, since ethanol may be readily dehydrogenated over a copper catalyst to yield acetaldehyde. Also, in commercial operation, the ethanol may contain a small amount of water. The mixture from this reaction, containing ethanol, acetaldehyde, water and hydrogen, along with recycled ethanol and acetaldehyde, the proportions being adjusted so that the final mixture contains about 3 mols of ethanol per mol of acetaldehyde, may be passed over the catalysts of this invention. Although these catalysts do not cause the hydrogen to react with any of the materials present, care should be taken that they are not contaminated with iron or copper impurities, since these metals are active hydrogenation catalysts. If desired, the hydrogen may be removed from the reactants before they enter the butadiene converter.

The reaction products from the butadiene converter are condensed at a temperature low enough, or a pressure high enough, to condense the butadiene, which boils at $-4.5°$ C., and the liquid condensate is fractionally distilled to separate the butadiene from the ethanol, acetaldehyde, water and impurities formed in the reaction. The ethanol, acetaldehyde and low boiling impurities are separated from the water and high boiling impurities, and recycled through the butadiene converter. Part or all of the ethanol may be recycled through the acetaldehyde converter. The low boiling impurities include diethyl ether, ethyl acetate and butyraldehyde and a batch still may be provided for the removal of such impurities from the system when they have accumulated in undesirable amounts.

The butadiene fraction as obtained even by efficient distillation contains a small amount of impurities which are removable by other processes. Acetaldehyde is present, since it forms an azeotropic mixture with butadiene. The acetaldehyde can be removed and recovered for repassage over the catalyst. The other impurities in the butadiene fraction are the butylenes and normal butane. Since their boiling points are very close to that of butadiene, it is difficult to remove them by simple fractional distillation. They can be removed, however, by distilling the butadiene fraction in the presence of a selective solvent for butadiene, such as dichlorethyl ether.

The temperature of the olefine-forming reactions may vary from about $150°$ C. to about $400°$ C. to $450°$ C., depending on the activity of the catalyst and the carbonyl compound being reacted. With acetaldehyde and ethanol, temperatures of about $300°$ C. to $400°$ C. are preferable. Within these ranges, somewhat lower temperatures are desirable when operating with carbonyl compounds in which an olefine bond is conjugated with the carbonyl group or when using secondary alcohols. The use of pressure may increase the speed of the reaction somewhat, but the process can economically be carried out at pressures just sufficient to compensate for the pressure drop through the converter.

In operation the catalysts tend to become deactivated by fouling with carbonaceous deposits. This occurs more rapidly at higher pressures, which makes the use of moderate pressure advantageous. The catalysts can be reactivated by blowing air over them at about $400°$ C. This operation is more effective in removing the deposits, and restoring the activity of the catalyst if a small amount of oxides of nitrogen are included with the air.

The promoted silica gel catalysts can be formed by evaporating the silica gel with a solution of a decomposable salt of zirconium, tantalum or columbium and roasting the catalyst at about 300° C. to 400° C. The impregnation can also be accomplished by dipping the silica gel in solutions of these decomposable salts. The nitrate is an effective salt for this purpose when catalysts containing zirconium oxide are to be prepared, and the citrates and oxalates give good results in the case of catalysts promoted with tantalum and columbium oxides.

The examples to follow will serve to illustrate the invention:

*Example 1*

A promoted silica gel catalyst was prepared by alternately digesting silica gel with nitric acid and washing it with water. The purified silica gel was then treated with an aqueous solution of zirconium nitrate and, after drying, the catalyst was heated at about 350° C. The heat treatment decomposed the zirconium nitrate to the oxide, and resulted in a catalyst impregnated with about 2% of zirconium oxide.

The catalyst was placed in a stainless steel tube and a mixture of ethanol and acetaldehyde in the molar ratio of 2 to 1, and containing about 8% by weight of water, was passed through the catalyst bed at a temperature of 330° C. Based on the acetaldehyde introduced, a 47% single-pass yield of the butadiene fraction was obtained which contained about 93% by weight of butadiene. The chief impurities in this fraction, as in corresponding fractions of subsequent examples, were acetaldehyde and the normal butylenes.

*Example 2*

A promoted silica gel catalyst was prepared by dissolving freshly precipitated columbic acid in aqueous citric acid, and then impregnating silica gel with this solution and evaporating the water. This mixture was placed in a stainless steel tube and heated in a current of air at a temperature of about 400° C. This resulted in the decomposition of the columbium citrate and the oxidation of the organic residue of the acid leaving a deposit of about 2% by weight of columbium oxide on the catalyst.

A mixture of ethanol and acetaldehyde in the molar ratio of 2 to 1, and containing about 8% by weight of water, was passed through the catalyst bed at 330° C. at a rate of about 4 mols of reactants per liter of catalyst per hour. The single-pass yield of butadiene fraction was about 42% based on the acetaldehyde, and the butadiene content of the fraction was about 87% by weight.

*Example 3*

A promoted silica gel catalyst was prepared by dissolving freshly precipitated tantalic acid in aqueous citric acid, and then impregnating purified silica gel with this solution and evaporating the water. This mixture was placed in a stainless steel tube and heated in a current of air at a temperature of about 370° C. This resulted in the decomposition of the tantalum citrate and the oxidation of the organic residue of the acid leaving a deposit of about 2% by weight of tantalum oxide on the catalyst.

A mixture of ethanol and acetaldehyde in the molar ratio of 2 to 1, containing about 8% by weight of water, was passed through the catalyst bed at 350° C. The single-pass yield of butadiene fraction amounted to 67% based on the acetaldehyde introduced. The butadiene content of the fraction was about 95% by weight.

*Example 4*

A commercial sample of zirconium silicate of a high degree of purity was mixed with water to form a paste and spread on a glass surface for drying. While the paste was still moist it was divided into pellets and these were then dried further. About 350 c. c. of these pellets were placed in a glass tube having an inside diameter of one inch containing a small tube for a thermocouple disposed along its axis. The tube was then heated in an electric furnace to 320° to 330° C.

A mixture containing 3.1 mols of ethanol, 1.45 mols of acetaldehyde and 0.8 mol of water was fed at a rate of about 60 c. c. of liquid per hour into a vaporizer and the vapors were passed through the catalyst bed. The products of the reaction were collected and fractionally distilled. A fraction of 25.6 grams of material boiling between —6° and 0° C. was obtained. This fraction contained 91.8% of butadiene. The total single-pass yield of the butadiene fraction based on the acetaldehyde consumed was about 35%.

*Example 5*

Zirconium hydroxide was precipitated by adding aqueous ammonia to an aqueous solution of zirconium nitrate. The precipitate was washed and partly dried, and then cut into pellets which were further dried. The pellets were heated to 340° C., resulting in the formation of zirconium oxide.

Ethanol and acetaldehyde in the molar ratio of 2 to 1, along with 8% by weight of water, were passed through the catalyst at this temperature. In this instance, the single-pass yield of the butadiene fraction was 21%, based on the acetaldehyde introduced, and the butadiene content of the fraction was about 90%.

*Example 6*

A zirconium silicate catalyst was prepared as described in Example 4. A mixture of ethanol and crotonaldehyde in the molar ratio of 2 to 1, and containing about 8 to 9% water, was vaporized and passed through about 300 c. c. of the catalyst at 330° C., and at a rate of about 4 mols per liter of catalyst per hour. Based on the crotonaldehyde introduced, a 49% single-pass yield of the butadiene fraction was obtained, and the butadiene content of the fraction was 95%.

*Example 7*

A zirconium oxide catalyst was prepared as described in Example 5. A mixture of ethanol and crotonaldehyde in the molar ratio of 2 to 1, and containing about 8 to 9% water, was vaporized and fed through about 300 c. c. of the catalyst at a temperature of 320° C., and at a rate of about 4 mols of reactants per liter of catalyst per hour. Based on the crotonaldehyde introduced, a 30% single-pass yield of the butadiene fraction, containing 90% butadiene, was obtained.

*Example 8*

A commercial sample of tantalum oxide containing 21% of columbium oxide was supported on ceramically bonded fused aluminum oxide. The amount of active catalyst on the support amounted to 10% by weight. Ethanol and crotonaldehyde in the molar ratio of 2 to 1, and containing about 8 to 9% by weight of water, were vaporized and fed through about 300 c. c. of the catalyst at a temperature of 380° C. at a rate of about 4 mols of reactants per liter of catalyst per hour. Based on the crotonaldehyde introduced, a 20% single-pass yield of butadiene fraction containing 83% by weight of butadiene was obtained.

Example 9

A mixture of 12.8 mols of ethanol and 4.22 mols of acetaldehyde, containing about 7% by weight of water, was vaporized at a rate of about 150 c. c. of the liquid mixture per hour. The vapors were passed into a catalyst chamber at 330° C., containing 325 c. c. of silica gel promoted with about 0.5% by weight of tantalum oxide. The products of the reaction were collected, separated by fractional distillation and analyzed. The recovered materials contained 9.54 mols of ethanol, 2.36 mols of acetaldehyde and 1.54 mols of butadiene. In addition, there was a small amount of material boiling between 9° and 95° C. with water which was not positively identified. There was also a small amount of oil-like residue boiling above 95° C.

Considering that the ethanol and acetaldehyde consumed are equivalents in the efficient production of butadiene, the following table lists the percentage of consumed ethanol and acetaldehyde which were converted to the products listed below:

|  | Per cent |
|---|---|
| Butadiene | 60.2 |
| Butylene | 2.4 |
| Ethylene and propylene | 8.5 |
| Unidentified material (B. P. 9–95° C., aq.) | 12.2 |
| Oil, boiling above 95° C | 4.7 |
| Unaccounted for and carbon on the catalyst | 12.0 |
| Total | 100.0 |

Example 10

A zirconia promoted catalyst was prepared by decomposing 12 grams of zirconium nitrate impregnated in 265 grams (300 c. c.) of 3 x 8 mesh silica gel. The feed mixture consisted of 1.15 mols of wet crotonaldehyde and 2.37 mols of ethanol. At a temperature of 340° to 345° C. and with a feed rate of about 4.5 mols per liter of catalyst per hour, a single-pass yield of 90% of butadiene fraction was obtained, based on the crotonaldehyde charged. Butadiene comprised 92% of the fraction. A considerable portion of the acetaldehyde co-product was evidently converted to butadiene in the reaction since the molar ratio of acetaldehyde to butadiene in the product was 0.26. If butadiene had been formed only by the reaction of the crotonaldehyde introduced with the ethanol, approximately equal molar amounts of acetaldehyde and butadiene in the reaction products would have been expected.

Example 11

This experiment illustrates the preparation of butadiene directly from ethanol. Specially denatured ethanol containing about 8% water and a trace of acetaldehyde as a denaturant were passed over a reduced copper catalyst supported on ceramically bonded fused aluminum oxide at a temperature of 220° to 265° C. The mixture from this converter containing ethanol and acetaldehyde in a molar ratio of about 2 to 1, along with water and hydrogen, was passed directly into a butadiene converter containing a silica gel catalyst promoted with about 0.5% of tantalum oxide. The reaction products from the butadiene converter were separated and identified. The results of the run are tabulated below:

|  | In | Out |
|---|---|---|
| Materials: |  |  |
| Ethanol, g | 2,206 | 1,001 |
| Acetaldehyde, g | 6 | 353 |
| Water, g | 207 | 488 |
| Butadiene, g |  | 296 |
| Unidentified materials (B. P. 9–95° C.), g |  | 111 |
| Higher boiling materials, g |  | 66 |
| Gas composition, liters |  | 472 |
| Hydrogen, 94.5% |  |  |
| Methane, 2.2% |  |  |
| Carbon monoxide 1.2% |  |  |
| Ethylene 1.8% |  |  |
| Propylene 0.1% |  |  |
| Carbon dioxide 0.2% |  |  |
| Total, g | 2,419 | 2,879 |

|  |  |
|---|---|
| Conditions and Results: |  |
| Duration, hours | 20.2 |
| Feed rate, cc./hour | 150 |
| Temperature, ° C.: |  |
| Aldehyde catalyst | 220–265 |
| Butadiene catalyst | 305 |
| Single-pass yield of butadiene from ethanol, per cent | 22.9 |
| Single-pass yield of unreacted acetaldehyde from ethanol, per cent | 16.4 |
| Production rate, g. of butadiene/liter of gel catalyst/hour | 43 |
| Accounting of ethanol plus acetaldehyde consumed, per cent as: |  |
| Butadiene | 59.9 |
| Oil and tar | 9.9 |
| Aqueous residue | 1.3 |
| Carbon oxides | 1.0 |
| Olefins (ethylene, propylene) | 4.9 |
| Butylene | 0.4 |
| Carbon on catalyst | 1.4 |
| Unidentified materials (B. P. 9–95° C. aqueous) | 13.8 |
| Unaccounted for | 7.4 |
| Total | 100.0 |

While the above examples are intended to illustrate preferred methods of practicing the invention, it is to be understood that modifications of the reaction conditions are permissible. For instance, the molar ratio of the reactants may be varied widely, although an excess of the alcohol is preferred. Similarly, the space velocity of the reactants is not critical so far as is known and may be varied considerably from the values shown. Similarly, the amount of zirconium, tantalum or columbium oxides on the promoted silica gel catalyst may be varied depending on the activity of the catalyst desired. In normal practice, these amounts might vary from about 0.1% to about 5%. As indicated in the above examples, silica gel promoted with tantalum oxide is the preferred catalyst. The addition of a small amount of columbium oxide to this preferred catalyst appears to enhance its activity and selectivity somewhat. While the catalysts of this invention vary in the yield of four-carbon-atom hydrocarbons which they produce, they are all characterized by their selectivity in promoting a very high content of butadiene in this fraction. In this property, the catalysts are to be sharply distinguished from those of the prior art.

We claim:

1. Process for making dienes which comprises passing an acyclic mono-olefinic aldehyde having at least four carbon atoms and a monohydric alcohol having at least one hydrogen atom attached to the carbinol carbon atom over a catalyst of the group consisting of the oxides and silicates of zirconium, tantalum, and columbium, and recovering a diene from the reaction products.

2. Process for making dienes which comprises passing a vaporous mixture, containing an acyclic mono-olefinic aldehyde having at least four carbon atoms and a monohydric alcohol having at least one hydrogen atom attached to the carbinol carbon atom, over a catalyst comprising silica gel promoted with zirconium oxide.

3. Process for making dienes which comprises passing a vaporous mixture, containing an acyclic mono-olefinic aldehyde having at least four carbon atoms and a monohydric alcohol having at least one hydrogen atom attached to the carbinol carbon atom, over a catalyst comprising silica gel promoted with tantalum oxide.

4. Process for making dienes which comprises passing a vaporous mixture, containing an acyclic mono-olefinic aldehyde having at least four carbon atoms and a monohydric alcohol having at least one hydrogen atom attached to the carbinol carbon atom, over a catalyst comprising silica gel promoted with columbium oxide.

5. Process for making dienes which comprises passing a vaporous mixture, containing a saturated monocarbonyl compound having from two to three carbon atoms and a monohydric alcohol having from two to three carbon atoms, over a catalyst of the group consisting of the oxides and silicates of zirconium, tantalum and columbium, and recovering a diene having from four to six carbon atoms from the reaction products.

6. Process for making dienes which comprises passing a vaporous mixture, containing a saturated monocarbonyl compound having from two to three carbon atoms and a monohydric alcohol having from two to three carbon atoms, over a catalyst comprising silica gel promoted with zirconium oxide, and recovering a diene having from four to six carbon atoms from the reaction products.

7. Process for making dienes which comprises passing a vaporous mixture containing a saturated monocarbonyl compound having from two to three carbon atoms and a monohydric alcohol having from two to three carbon atoms, over a catalyst comprising silica gel promoted with tantalum oxide, and recovering a diene having from four to six carbon atoms from the reaction products.

8. Process for making dienes which comprises passing a vaporous mixture, containing a saturated monocarbonyl compound having from two to three carbon atoms and a monohydric alcohol having from two to three carbon atoms, over a catalyst comprising silica gel promoted with columbium oxide, and recovering a diene having from four to six carbon atoms from the reaction products.

9. Process for making butadiene which comprises passing a vaporous mixture containing acetaldehyde and ethanol over a catalyst of the group consisting of the oxides and silicates of zirconium, tantalum and columbium.

10. Process for making butadiene which comprises passing a vaporous mixture containing acetaldehyde and ethanol over a catalyst of the group consisting of the oxides and silicates of zirconium, tantalum and columbium at a temperature of about 150° C. to about 450° C., the molar ratio of ethanol to acetaldehyde in said mixture being greater than one.

11. Process for making butadiene which comprises passing a vaporous mixture containing acetaldehyde and ethanol over a catalyst comprising silica gel promoted with zirconium oxide at a temperature of about 150° C. to about 450° C., the molar ratio of ethanol to acetaldehyde in said mixture being greater than one.

12. Process for making butadiene which comprises passing a vaporous mixture containing acetaldehyde and ethanol over a catalyst comprising silica gel promoted with tantalum oxide at a temperature of about 150° C. to about 450° C., the molar ratio of ethanol to acetaldehyde in said mixture being greater than one.

13. Process for making butadiene which comprises passing a vaporous mixture containing acetaldehyde and ethanol over a catalyst comprising silica gel promoted with columbium oxide at a temperature of about 150° C. to about 450° C., the molar ratio of ethanol to acetaldehyde in said mixture being greater than one.

14. Process for making butadiene which comprises passing ethanol vapors over a copper catalyst to form a mixture containing ethanol and acetaldehyde, and thereafter passing a mixture containing ethanol and acetaldehyde obtained from this reaction at a temperature of about 150° C. to about 450° C. over a catalyst comprising silica gel promoted with tantalum oxide, separating ethanol and acetaldehyde from the butadiene formed, and recycling the acetaldehyde and at least part of the separated ethanol over said promoted silica gel catalyst.

15. Process for making butadiene which comprises passing ethanol vapors over a copper catalyst to form a mixture containing ethanol and acetaldehyde, and thereafter passing a mixture of ethanol and acetaldehyde obtained from this reaction at a temperature of about 150° C. to about 450° C. over a catalyst comprising silica gel promoted with tantalum oxide, separating ethanol and acetaldehyde from the butadiene formed, and recycling the separated acetaldehyde and part of the separated ethanol over said promoted silica gel catalyst, and recycling part of the separated ethanol over the copper catalyst.

16. Process for making butadiene which comprises passing a vaporous mixture containing crotonaldehyde and a monohydric alcohol having at least one hydrogen atom attached to the carbinol carbonation over a catalyst of the group consisting of the oxides and silicates of zirconium, tantalum and columbium, and recovering butadiene from the reaction products.

17. Process for making butadiene which comprises passing a vaporous mixture of crotonaldehyde and ethanol at a temperature of about 150° C. to about 400° C. over a catalyst comprising silica gel promoted with tantalum oxide, and recovering butadiene and acetaldehyde from the reaction products.

18. Process for making butadiene which comprises passing a vaporous mixture of crotonaldehyde and ethanol at a temperature of about 150° C. to about 400° C. over a catalyst comprising silica gel promoted with columbium oxide, and recovering butadiene and acetaldehyde from the reaction products.

19. Process for making butadiene which comprises passing a vaporous mixture of crotonaldehyde and ethanol at a temperature of about 150° C. to about 400° C. over a catalyst comprising silica gel promoted with zirconium oxide, and recovering butadiene and acetaldehyde from the reaction products.

20. A process for producing butadiene which comprises vaporizing ethanol and a member of the group consisting of acetaldehyde and crotonaldehyde, passing the resulting vapors over a catalytic agent comprising silica and zirconium oxide at a temperature of about 375° C. to about 450° C., and thereafter removing butadiene from the reaction products.

WALTER J. TOUSSAINT.
JESSE T. DUNN.

REFERENCES CITED

The following references are of record in the file of this patent:

UNITED STATES PATENTS

| Number | Name | Date |
|---|---|---|
| 1,682,919 | Maximoff | Sept. 4, 1928 |
| 2,297,424 | Maximoff et al. | Sept. 29, 1942 |
| 1,914,722 | Jaeger | June 20, 1933 |
| 1,418,448 | Legg | June 6, 1922 |

FOREIGN PATENTS

| Number | Country | Date |
|---|---|---|
| 15,806 | Great Britain | July 2, 1914 |

OTHER REFERENCES

Ostromyslenski, "New Methods of Preparing Erythrene," J. Soc. Chem. Ind., 35, p. 69, No. 1 (1916). (Copy in 260–680.)

Cumming et al., "Systematic Organic Chemistry," (1926), page 410, lines 25 et seq. (Copy in Division 6.)

Certificate of Correction

Patent No. 2,421,361.  May 27, 1947.

WALTER J. TOUSSAINT ET AL.

It is hereby certified that error appears in the printed specification of the above numbered patent requiring correction as follows: Column 10, line 46, claim 16, for "carbonation" read *carbon atom*; and that the said Letters Patent should be read with this correction therein that the same may conform to the record of the case in the Patent Office.

Signed and sealed this 22nd day of July, A. D. 1947.

[SEAL]

LESLIE FRAZER,
*First Assistant Commissioner of Patents.* oxide at a temperature of about 375° C. to about 450° C., and thereafter removing butadiene from the reaction products.

WALTER J. TOUSSAINT.
JESSE T. DUNN.

REFERENCES CITED

The following references are of record in the file of this patent:

UNITED STATES PATENTS

| Number | Name | Date |
|---|---|---|
| 1,682,919 | Maximoff | Sept. 4, 1928 |
| 2,297,424 | Maximoff et al. | Sept. 29, 1942 |
| 1,914,722 | Jaeger | June 20, 1933 |
| 1,418,448 | Legg | June 6, 1922 |

FOREIGN PATENTS

| Number | Country | Date |
|---|---|---|
| 15,806 | Great Britain | July 2, 1914 |

OTHER REFERENCES

Ostromyslenski, "New Methods of Preparing Erythrene," J. Soc. Chem. Ind., 35, p. 69, No. 1 (1916). (Copy in 260–680.)

Cumming et al., "Systematic Organic Chemistry," (1926), page 410, lines 25 et seq. (Copy in Division 6.)

Certificate of Correction

Patent No. 2,421,361.      May 27, 1947.

WALTER J. TOUSSAINT ET AL.

It is hereby certified that error appears in the printed specification of the above numbered patent requiring correction as follows: Column 10, line 46, claim 16, for "carbonation" read *carbon atom*; and that the said Letters Patent should be read with this correction therein that the same may conform to the record of the case in the Patent Office.

Signed and sealed this 22nd day of July, A. D. 1947.

[SEAL]

LESLIE FRAZER,
*First Assistant Commissioner of Patents.*